United States Patent [19]
Gove et al.

[11] Patent Number: 5,608,468
[45] Date of Patent: Mar. 4, 1997

[54] METHOD AND DEVICE FOR MULTI-FORMAT TELEVISION

[75] Inventors: Robert J. Gove; Jeffrey B. Sampsell, both of Plano; Vishal Markandey, Dallas, all of Tex.

[73] Assignee: Texas Instruments Incorporated, Dallas, Tex.

[21] Appl. No.: 482,477

[22] Filed: Jun. 7, 1995

Related U.S. Application Data

[62] Division of Ser. No. 091,852, Jul. 14, 1993.

[51] Int. Cl.⁶ .................................................. H04N 5/74
[52] U.S. Cl. ................................. 348/771; 348/770
[58] Field of Search ................................. 348/770, 771, 348/755; 353/122; H04N 8/74

[56] References Cited

U.S. PATENT DOCUMENTS 3,896,338  7/1975  Nathanson et al. .................. 348/771
5,442,414  8/1995  Janssen et al. ...................... 348/771

FOREIGN PATENT DOCUMENTS

| | | |
|---|---|---|
| 0069226 | 1/1983 | European Pat. Off. . |
| 0465063 | 1/1992 | European Pat. Off. . |
| 0469293 | 2/1992 | European Pat. Off. . |
| 0528548 | 2/1993 | European Pat. Off. . |
| WO9209172 | 5/1992 | WIPO . |

*Primary Examiner*—Victor R. Kostak
*Attorney, Agent, or Firm*—Julie L. Reed; James C. Kesterson; Richard L. Donaldson

[57] ABSTRACT

A spatial light modulator with hexagonal elements or pixels. The elements include a reflective hexagonal surface supported by flexible hinges. The hinges are in turn supported by support posts away from a substrate. On the substrate are control or address electrodes which control the direction of deflection of the reflective surface by selective build up of electrostatic forces. The use of hexagonal pixels allow the posts and electrodes to be arrayed in horizontal lines, thereby allowing reset of horizontal lines of the pixels.

1 Claim, 11 Drawing Sheets

INPUT

BILINEAR INTERPOLATION
OUTPUT

EDGE SENSITIVE BILINEAR
INTERPOLATION OUTPUT

METHOD AND DEVICE FOR MULTI-FORMAT TELEVISION

This is a division of applications Ser. No. 08/091,852, filed Jul. 14, 1993.

BACKGROUND OF THE INVENTION

1. Field of the Invention

This invention relates to displays, more particularly to displays that must support multiple video standards and use two dimensional spatial light modulators (SLMs) as their light modulating elements.

2. Background of the Invention

From the 1950s through the early 1990s several video display standards have evolved. As display technology moves to high-definition displays (HDD) and high-definition television (HDTV), many more standardized formats have appeared. Some of these are ATV (Advanced Television) or US-HD (United States High Definition), possibly HD-MAC (High Definition Multiplexed Analogue Component), and MUSE (Multiple Sub-Nyquist-Sampling Encoding) in Japan. These formats all produce what are considered to be high-definition displays, yet all have different numbers of horizontal lines and different numbers of resolution elements (or pixels) along those lines, as well as different frame rates. All of the aforementioned HD formats except US-HD are analog, but the US format will be digitally implemented and specified, as are any number of computer display formats. The ability to present these numerous digital and analog standards adequately on a single display system in a cost effective manner can be an important performance and cost differentiator between competing display systems.

Sequentially scanned displays, like CRTs, can display pixels continuously through a scan line, limited only by the MTF of the monitor. Discrete sample displays, like those based on liquid-crystal devices (LCD) or digital micromirror devices (DMD) SLMs, have fixed pixel placements and aspect ratios that demand adjustment of the input data so incoming images with different aspect ratios, scales, and horizontal resolutions are displayed with acceptable fidelity. In these devices a picture is displayed on an array of rows and columns of individual cells. The analog standards must be sampled in these systems and pre-sampled digital standards may be sampled at resolutions incommensurate with the SLM resolution.

A problem then exists in building a display system that is portable among the analog standards, and yet still compatible with digital standards such as US-HD. If the system is built to be US-HD compatible, the problem of adjusting to the various analog standards exists. Since the number of samples and the aspect ratios and pitch of the pixels will not be an exact match for any of the other standards, resampling or scaling of the data will be required. Total display system complexity, including the image processing system as well as the SLM system, will depend on the trade-offs between the SLM design and the processing algorithms. Within these trade-offs consideration must be given to problems of aliasing, poor picture quality and expense.

SUMMARY OF THE INVENTION

One aspect of the invention is a spatial light modulator with hexagonal elements or pixels. Each element has at least two support posts, which in turn support flexible hinges. The hinges connect between the support posts and a hexagonal reflective surface, thereby spacing the hexagonal reflective surface away from a substrate. The support posts other than at the edge of the array of elements support two elements, one on each side. Underneath the reflective surface on the substrate are address electrodes. When the address electrodes are activated, electrostatic forces between the electrodes and the reflective surface cause it to deflect about the hinges towards one electrode or the other. The direction the surface deflects is determined by which electrode has the proper voltage to cause the electrostatic forces to attract the surface towards it. The electrodes are electrically connected to adjacent electrodes, allowing line reset.

It is an advantage of the invention in that it allows closely packed pixels for higher definition imaging.

It is a further advantage of the invention in that it allows the pixels to be reset along a horizontal line of the array, rather than along a diagonal.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
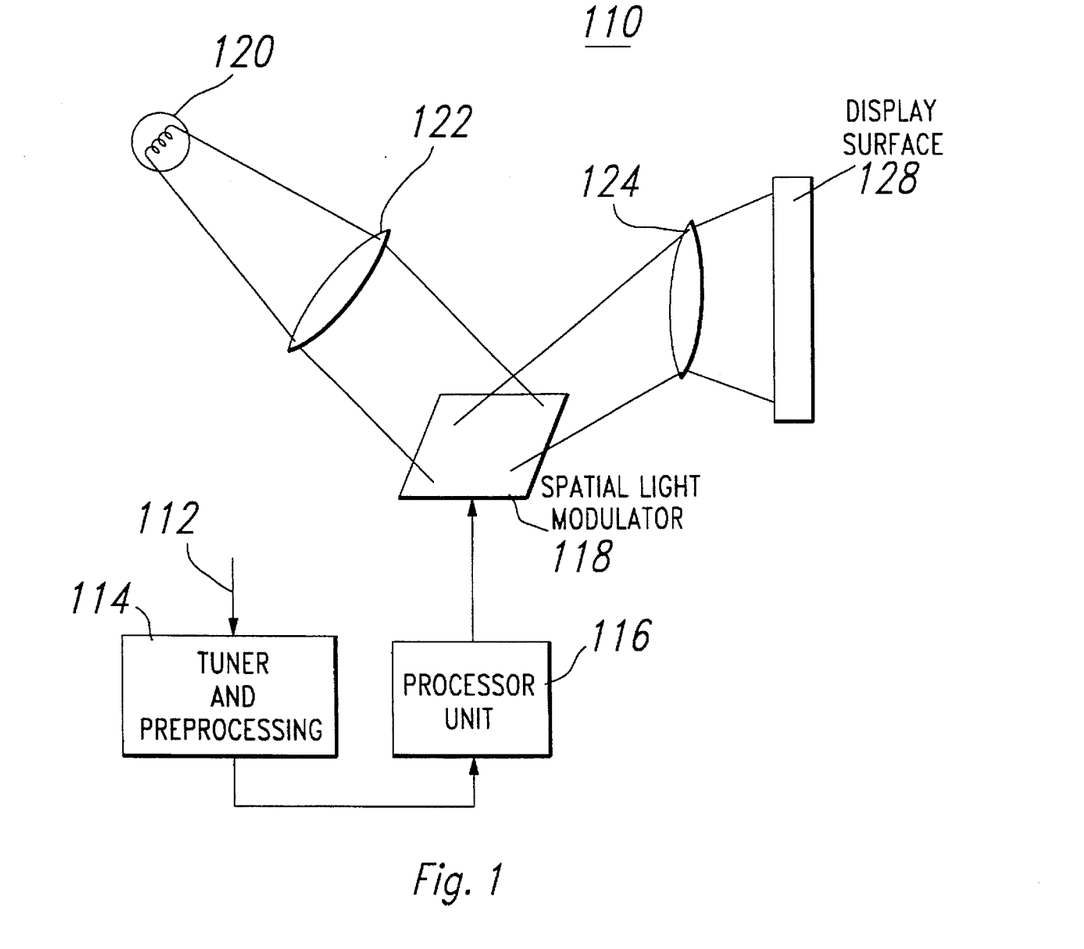
FIG. 1 shows a block diagram of a multi-format display system.

One possible configuration of a multi-format display system appears in FIG. 1. The system 10 includes, but is not limited to, a tuner/pre-processing unit 114, a processor unit 116, a spatial light modulator 118, illumination source 120, display surface 128, and optical systems 122 and 124. The incoming signal enters the system via line 112. Depending upon the video delivery method, either vias transmission (wires, cable) or distribution (CD, video tape), and the location of the video production (U.S., Japan, Europe), the incoming signal will have widely varying formats and signal presentations. For the purpose of discussion, we will refer to the system configuration which receives data in the US via transmission (i.e. US-HDTV and NTSC inputs).

After the data enters the system, it is received and filtered in tuner/preprocessor unit 114. The signal can then be passed to the processing unit 116, or the processing functions can be divided between tuner/preprocessor 114 and processing unit 116. For discussion purposes, the functions will be arbitrarily divided between the two units. In the case of an analog input signal, unit 114 accomplishes the digitization of the signal and performs any signal conditioning such as NTSC decoding, color space conversion or filtering for sharpness, etc.

The data is then passed to processor unit 116. Processor unit 116 then converts the data into the proper format for display on a selected spatial light modulator. For a reference point, a spatial light modulator of 2048 pixels across×1152 pixels down will be assumed, which corresponds to the highest resolution format currently proposed for HDTV, having a 16:9 aspect ratio. It is also assumed that the SLM has "square" or 1:1 aspect ratio pixels. As an example, if 960 line data of a format that has been proposed for US-HD transmission is to be presented at the proper 16:9 aspect ratio the data must be converted to have 1707 pixels per line. Digital processing must be performed to do this conversion even though US-HD is transmitted in digital, "prepixelized" form, since the standard transmits less that 1500 pixels on each of the 960 lines. Without digital conversion of the 1500 pixels to 1707 pixels, an apparent vertical elongation of objects, by about 15%, will occur on the display. No matter what final data format is chosen for US-HDTV, digital scaling will be necessary if non-square pixels are distributed, a highly likely prospect due to the bandwidth limitations of the 6 MHz NTSC channels.

If NTSC standard video of 480 line resolution is to be presented on the same display at its standard 4:3 aspect ratio, the incoming signal that is analog, as are most of the proposed and existing HD standards, can be digitized to the proper aspect ratio by sampling at 640 pixels per horizontal line. The sample data can be doubled in two dimensions to achieve a 1280×960 display, or, after digitization, more complex digital techniques can be used to create an interpolated 1280×960 pixel image.

Most HD transmission standards specify discrete samples that fit into a particular bandwidth. The most effective use of a digital, fixed-sample-number display, like SLMs, requires a one-to-one mapping of the source pixels onto the display pixels. Certain DMDs also require square pixels on a square grid, forcing the system to perform interpolation of non-square pixels in the proposed US-HDTV formats. Independent of digital display considerations, most HD standards also require the use of interpolation hardware to rescale the data. This hardware performs spatial and/or temporal decompression to reduce the bandwidth necessary for transmission, and, since this processing power is already built into the display, it may be convenient to use it for scaling between various standard formats.

An additional application of this digital processing unit can be the ability to correct typical artifacts and defects in digitized data that has been scaled. This is an especially important application since scaling creates new pixels with algorithms and heuristics. Simple (and inexpensive) algorithms, such as bilinear, cubic, or spline interpolation, "blindly" magnify a signal by filling in new pixels. These new pixels cannot add information in the scene unless more advanced concepts are used to analyze the data within the image for content or features. Without this information the simple algorithms, examples of which are shown below, pre-suppose the visual data, and periodically create a pixel incorrectly.

Typically, these algorithms generate the pixels in the scaled image by combining weighted combinations of their spatial neighbors in the original image. These techniques are image content insensitive, in that the interpolation process is the same regardless of image content. For example, if luminance is used to fill in between two pixel values, the algorithms may not notice that the 2 pixels had the same intensity but were completely different colors. This may cause chromatic errors in the image. The incorrect pixels also lead to edge softening, as similar errors occur in dark/bright transitions. Using such scaling techniques to scale video for NTSC and HDTV displays can potentially result in a picture that is visually not as sharp as the original picture. Consequently there is a need for a technique that can scale the picture for NTSC and HDTV displays on the DMD devices mentioned above, while retaining picture sharpness.

The terminology 'edge pixel' in the following discussion, refers to pixels depicting an edge in the original image. The following sections describe in detail some of the common scaling techniques and development of a scaling technique to address the above-mentioned need.

Nearest Neighbor

Nearest neighbor operates by taking the nearest pixel that is on the same row as the edge pixel, and replicating the edge pixel's intensity value into that pixel. This can be a problem when the nearest pixel is on the other side of the edge, especially when the other side is opposite in intensity to the side the edge pixel is on, i.e. light pixels next to dark pixels.

Bi-linear Interpolation.

Bi-linear interpolation computes the pixel value at the interpolation point by computing a weighted sum of original pixel values on either sides of it. If the pixel to be interpolated, X, was located at distance "a" from pixel 2 ($P_2$), and distance "b" from pixel 1 ($P_1$), the value of pixel would be:

$$X=aP_2+bP_2.$$

The sum of "a"+"b"=1, and the closer a pixel is the more weight it should be given. In the above example, the distance "b" is greater, so it is multiplied with the closer pixel $P_2$. This technique is pixel location insensitive, and will interpolate across edge locations. Thus, in the above example, $P_1$ could be on one side of an edge and $P_2$ on the other side, leading to edge softening at X. Smooth variations in intensity or color will be accurately "filled in" with bilinear interpolation, however, the edges may not. Detection of the edge and switching between Nearest Neighbor and Bilinear Interpolation will improve the scaling.

Figure 2A:
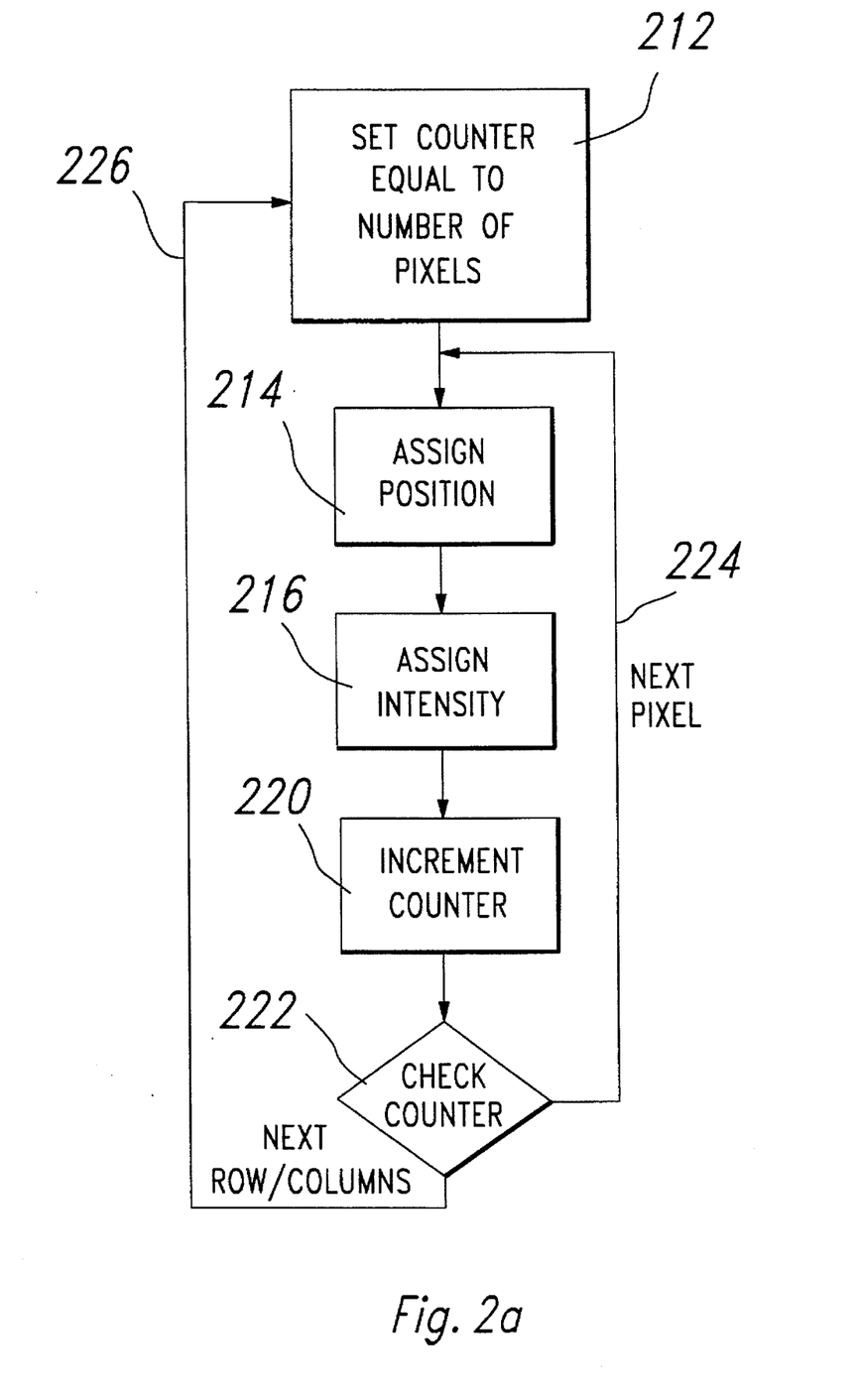
FIGS. 2a–b show flow charts of a processing technique performed on incoming video data.

FIG. 2a shows an example of a processing technique that can be performed upon the data as it is being scaled to the various formats previously mentioned. In 212, a counter is initialized. The counter will be used to track what pixel number the technique is operating on, and check to see if it is operating on pixels in the same row or column. In step 214, the position of the scaled pixel is assigned. This is typically determined from the position of unscaled pixels in the same row or column position as the scaled position. The intensity for the scaled pixel is then assigned. This ends the assignments for that particular scaled pixel. The counter is then incremented and then checked. If the counter is equal to the number of pixels in the row or column that the technique was operating in, a new row or column is started and the counter is reinitialized. If the row or column has not been completed, the next pixel is scaled. This process continues until all of the rows or columns have been scaled.

Figure 2B:
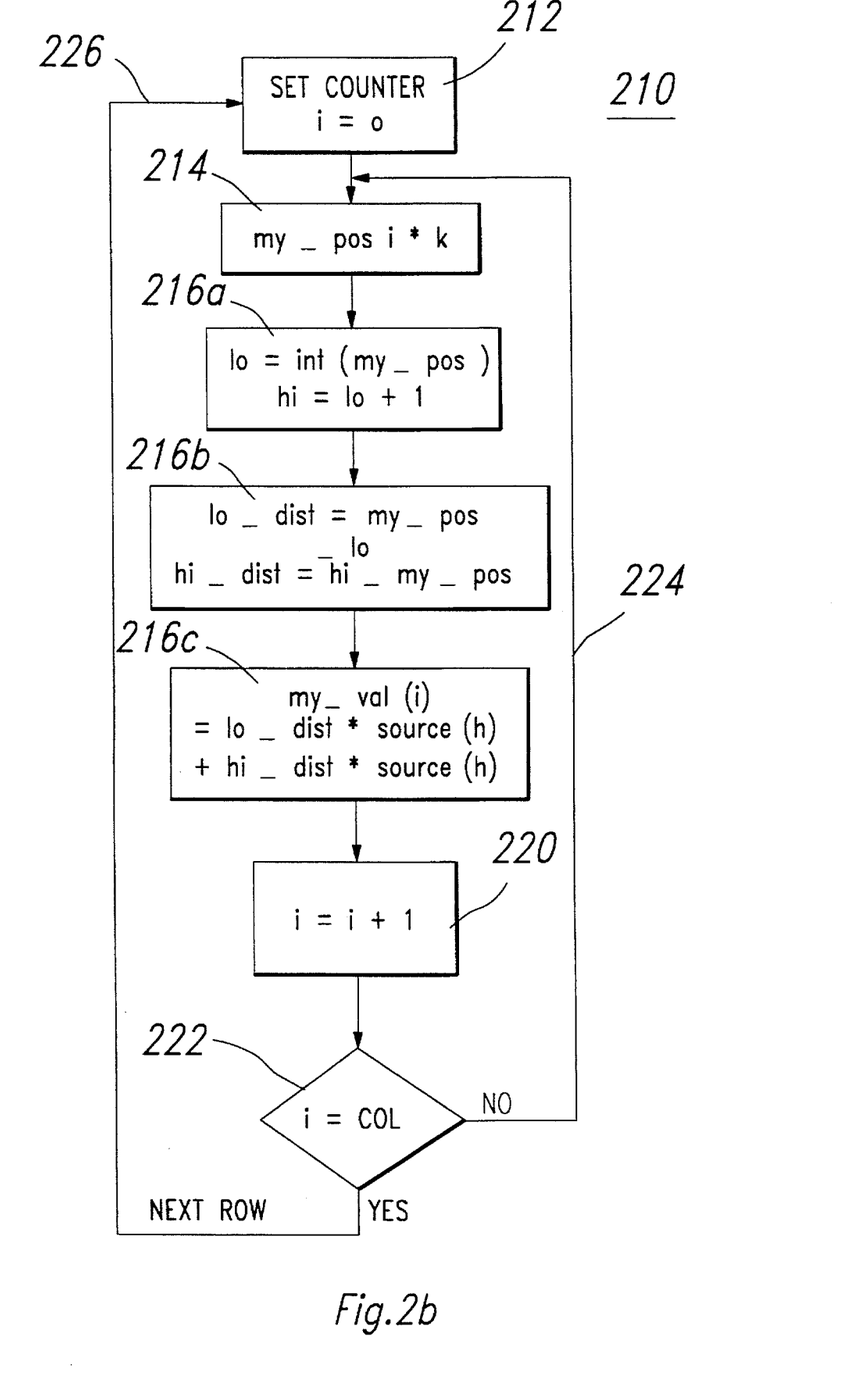

One embodiment of such a processing technique is shown in FIG. 2b. Step 212 remains the same. In step 214, the position is assigned by multiplying the scaling factor by the counter. For example, if the image is to be twice the size of the incoming data, the scaling factor would be 2.

Step 216 from FIG. 2a is expanded to include numerous steps. In step 216a, the intensity value of the previous pixel to the one being scaled is determined using the current pixel position calculated in step 214. One method of doing this is to define the previous pixel intensity to be the integer portion of the current pixel position calculated in 214. If the scaling is a fractional value, such as 1.25, there does exist the possibility of there being a fractional portion of the current pixel position. The intensity of the next pixel would then be defined to be the intensity of the previous pixel plus one.

In step 216b, the distances between the current pixel, the previous pixel and the next pixel are found. One way to accomplish this is to take the current pixel position and either subtract the previous pixel's intensity to calculate the previous pixel's distance. The current pixel position and the next pixel's intensity would be added for the next pixel's distance.

Finally, in step 216c, the intensity value for the current pixel is assigned. This is accomplished by adding the previous pixel's distance multiplied by the source intensity of the previous pixel, to the next pixel's distance multiplied by the next pixel's source intensity. After the position and intensity of the current pixel is found, the counter is incremented and the process continues as it did in FIG. 2a.

Figure 3A:
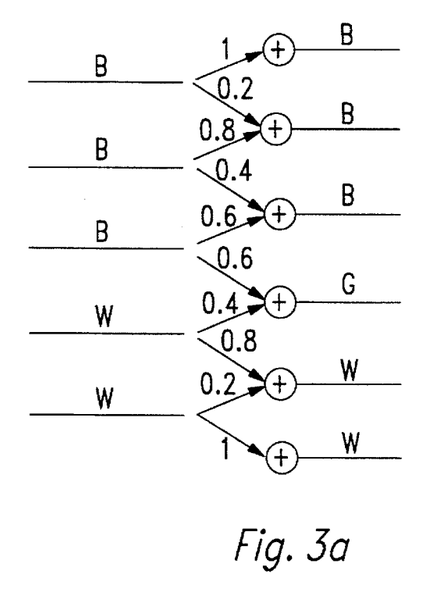
FIGS. 3a–3c show diagrams of interpolation algorithms and the resulting output patterns.
Figure 3B:
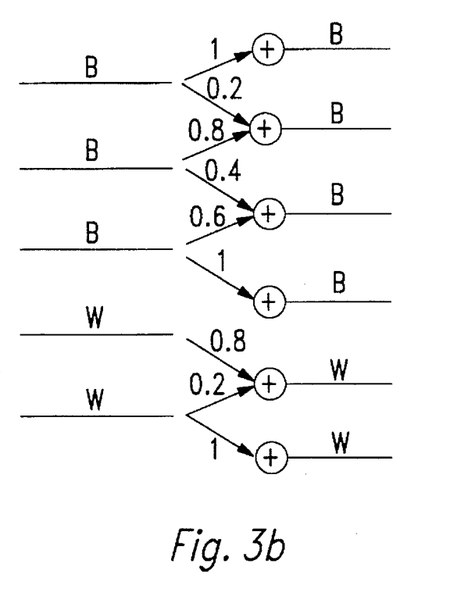
Figure 3C:
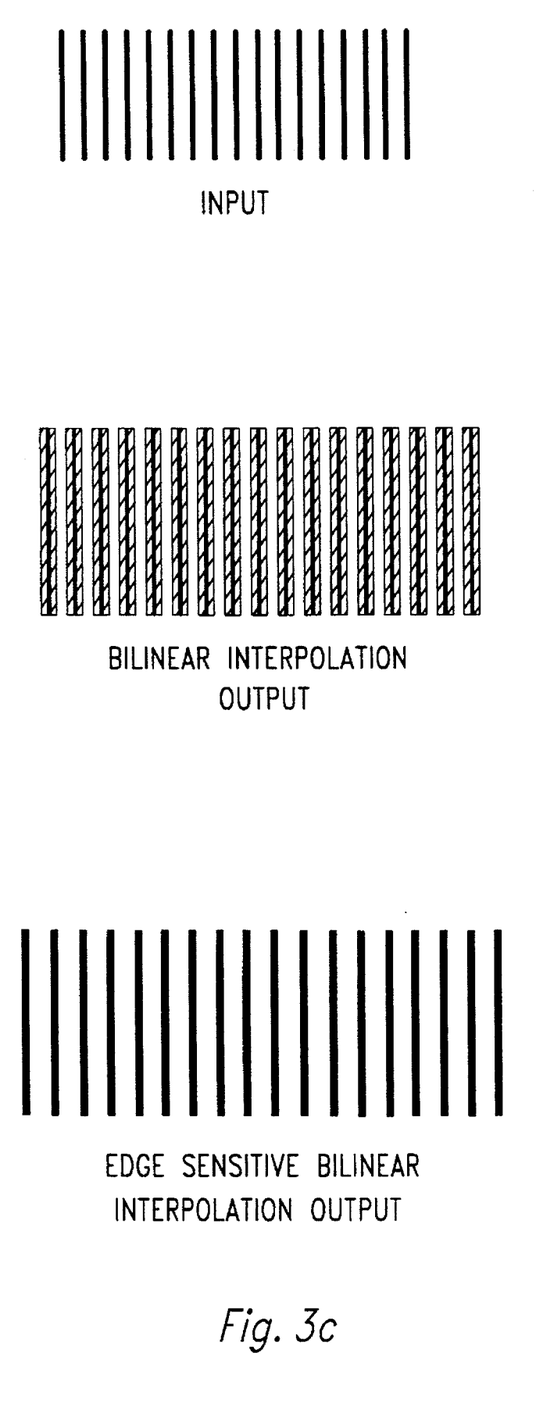

This technique is image content sensitive. It performs edge detection on the original imagery and will not interpolate across sharp edges in the original data. As a result, sharp edges in the original imagery are reproduced as sharp edges in the scaled imagery and do not get softened or blurred. This technique can be used with any of the scaling techniques listed above to enhance their performance and provide better picture quality. FIGS. 3a–c provides an example of using this technique with bilinear interpolation for 4 to 5 vertical picture scaling. The letters B, W, and G refer to black, white and gray shades in the picture.

FIG. 3a shows the result of direct bilinear interpolation and FIG. 3b shows the result of the technique discussed above. FIG. 3c provides an image example comparing the above technique with direct bilinear interpolation. In FIG. 3a, bilinear interpolation scaling is being performed only in the row direction, 5 rows begin scaled to 6 rows. FIG. 3a shows the scaling using only ordinary bilinear interpolation. It can be seen that a spurious gray scale (G) is produced in the scaled picture. This will blur the otherwise sharp edge between black and white.

FIG. 3b shows the scaling using the technique above, the edge-sensitive approach. At the time of producing each line in the output (scaled) picture, the edge strength of the two input lines being used is computed. If no edge is detected, then bilinear interpolation is performed. If an edge is detected, then the interpolation is not performed between those lines to produce the corresponding output line. Instead, the corresponding output line is produced by replicating the value from the input line closest to it. The results are shown in FIG. 3c.

Figure 4:
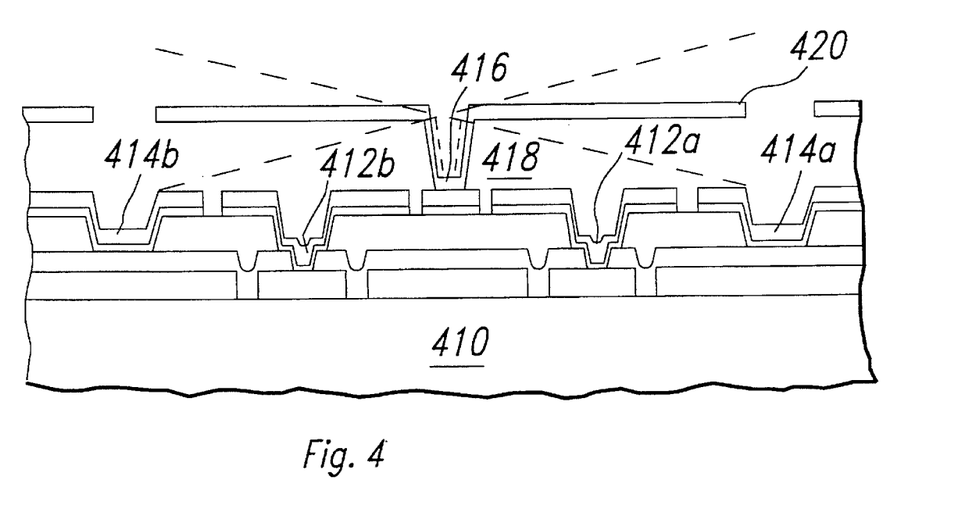
FIG. 4 shows a schematic drawing of a digital micromirror device.

After being processed by the algorithm, the converted data is passed to the addressing structure of the spatial light modulator. A particular type of spatial light modulator which is well-suited for the discussion is the digital micromirror device, shown in FIG. 4. The details of the operation of this device can be found in U.S. Pat. No. 5,061,049, entitled "Spatial Light Modulator and Method." In short, the modulator 410 typically consists of $17\mu \times 17\mu$ ($289\mu^2$) mirrors, one architecture of which is shown in FIG. 4. The mirror, 420, is suspended by hinges on posts 416 over an air gap 418. On the other side of the air gap are two electrodes 412a and 412b which allow the mirror to be twisted about its hinges to one side or the other. Note that this is only true for the torsion beam DMD, one of many architectures currently in use.

Figure 5A:
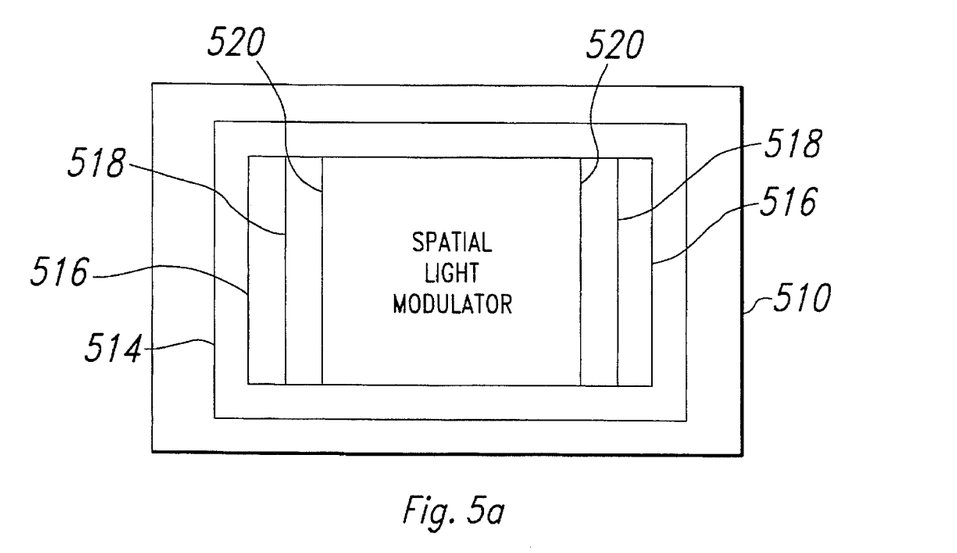
FIGS. 5a–5b show block diagrams of the relative sizes of the various formats on the face of a spatial light modulator.

The face of a spatial light modulator such as the DMD is depicted in block diagram format in FIG. 5a. The outer box 510 represents the edges of the active modulation area, again assumed to be 2048×1152 pixels. The full active area of this modulator represents the resolution required to portray HD-MAC or wide PAL signals. The inner boxes show other various formats and their respective positions on the face of the modulator (not to scale). Box 514 shows the fit of baseband MUSE or SMPTE 240M format data, which is 1920×1035. Boxes 516, 518, and 520 all have the same number of rows, 960.

Box 516 has 1707 columns, which represents the resolution needed to present HD proper 16:9 aspect ratio 960 line images. Since 960 is twice the current NTSC format, it's common belief that the US-HDTV format will have 960 lines to simplify back-compatibility. Box 518 represents the image that would result if one of the proposed US-HD standards, decoding 1440 columns, were displayed without rescaling. Box 520, 2 times the NTSC standard, is 1280 columns. As can be seen by the block diagram, all of the formats will fit onto the face of the modulator, but the US-HD image would be compressed approximately 15% in the horizontal direction from its proper 1707 column dimension. This distortion would be objectional when viewed. US-HD is the only digital standard shown here and would have to be rescaled using one of the techniques discussed above (or a similar technique).

Therefore the SLM shown would be appropriate for all of the standards described if processing circuitry was provided to rescale the US-HD image and analog resampling circuitry was provided. Depending on the MUSE decoder processing method, digital or analog, a MUSE source may also need digital scaling. MUSE decoders typically include a D/A filter and A/D resampling to alter the bandwidth of the data to tailor the number of pixels for display. This A/D/A and finally D for digital display is noise-prone and expensive.

In the case of US-HD (as in MUSE decoders) an apparent short-cut to digital rescaling might seem to be to convert the 1440 pixel, decoded digital data stream to analog and then resample it at 1707 pixels per line. The problem lies in the digitization already inherent in the incoming signal. A certain set of algorithms have been used to sample the original analog waveform, and reconverting that sampled signal to analog and redigitizing runs the risk of inducing a new set of interference artifacts between the two sets of algorithms or a reduction in the bandwidth available for display, using antialiasing filters.

The above discussion has assumed that the SLM pixels are standard square pixels. In the DMD the tilting mirrors in this type of array are electrically connected, usually globally across the entire array. This is because the pixels' axis of rotation is on a diagonal. There are actually two sets of electrodes on the diagonals, which allow the mirror to operate correctly. The first set 412a and 412b activate the mirror by applying a bias that causes the mirror to be attracted to one or the other. The other set, 414a and 414b, is at the outer tip of the mirror, which allow the corners of the mirror to land on them for stability. Since all of the landing electrodes must be at the same bias as the mirrors, to avoid drawing any current, it increases manufacturability to tie them all together along the diagonal.

This diagonal interconnection becomes problematical when one considers the nature of video signals. Video data is usually formatted in horizontal rows, and to accept this data one row at a time it would be convenient to interconnect the mirrors along horizontal lines. This means that the horizontal data format does not match the diagonal interconnection format of the mirrors themselves, making line reset effectively impossible. To reset one line of electrodes, the new data must be loaded into every column which would cause massive resetting of diagonal lines of the picture.

Figure 6:
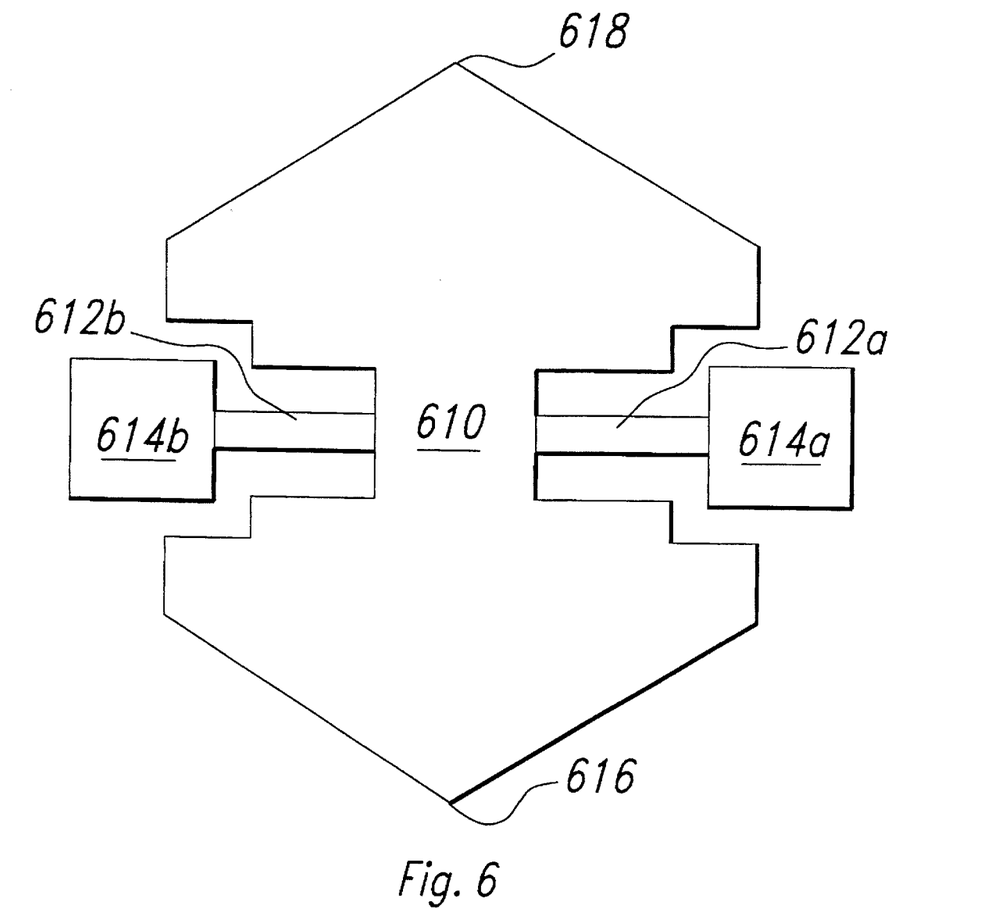
FIG. 6 shows an example of a hexagonal shaped DMD pixel.

However, different pixel arrangements can be considered, and these arrangements present different trade-offs with the kind of image processing/rescaling that would be done to present multiple image standards on these different SLM designs. If the pixel shape was hexagonal, with the posts "sideways" on the face of the modulator, the electrodes could be situated, so that one horizontal line of pixels may be reset by itself. An example of this shape of pixel is shown in FIG. 6.

The mirror 610 is supported by two hinges, 612a and 612b, from posts 614a and 614b. If the electrode under the top half of the mirror were activated, the top point of the mirror 618, would move down, and the bottom point 616 would rise, forming a slanting surface off of which light could be reflected. Similarly, the mirror could be made to tip in the other direction. Since the deflecting tips are horizontal, the electrodes can be put all in a line, allowing line-at-a-time reset.

Figure 7:
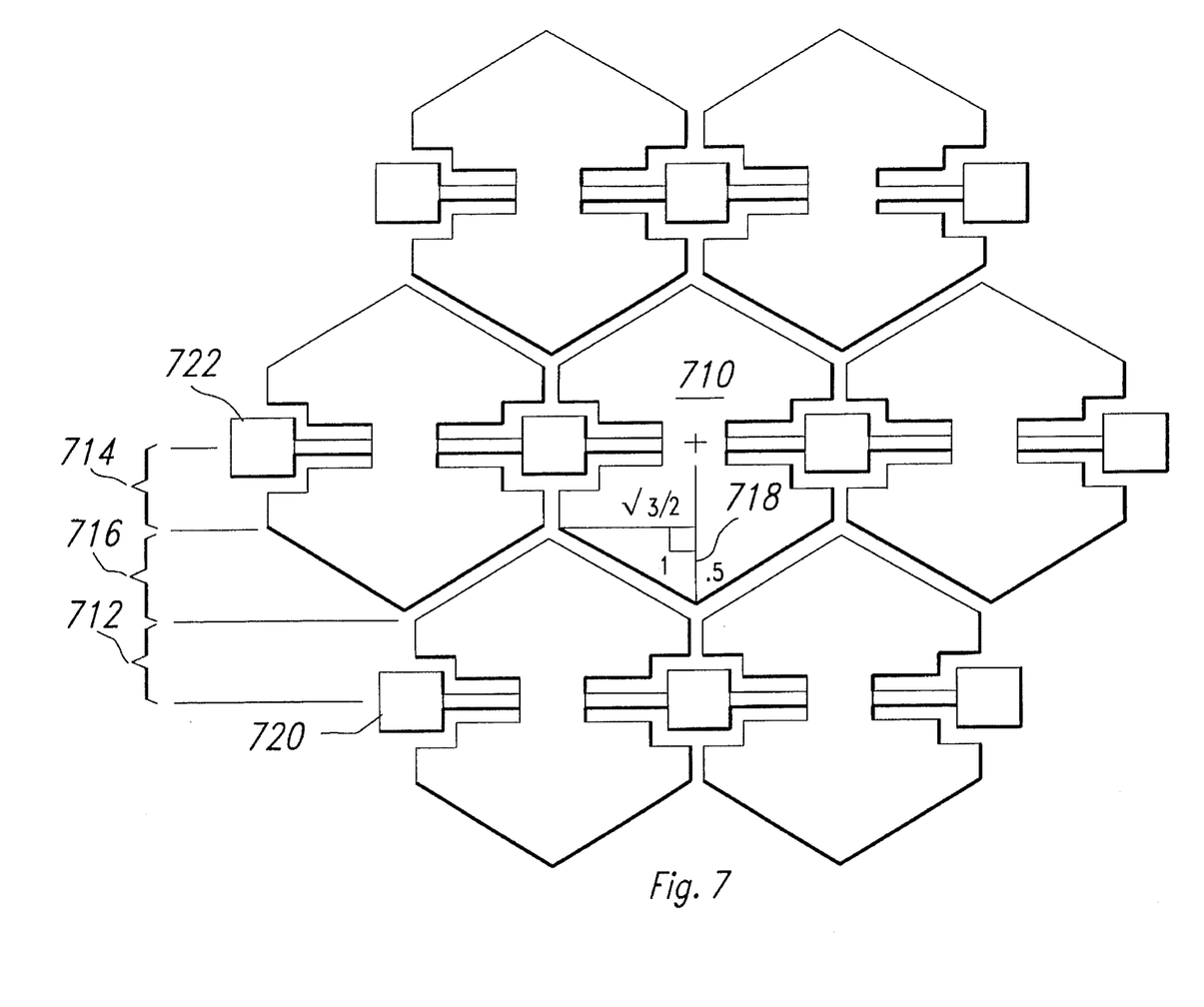
FIG. 7 shows an array of hexagonal shaped DMD pixels.

An additional advantage is the close packing of the pixels, shown in FIG. 7. This arrangement requires 13% less pixels to fill a give aspect ratio area with a given number of horizontal lines than does a square pixel array: All of the sampling patterns that normally require 2048×1152 pixels can be achieved in 1774×1152 pixels. This reduction in size likewise reduces the amount of memory in the associated electronic system, lowering the expense. Further, this also reduces the surface area, making the manufacturability increase with respect to current steppers and reticles. The dimensions of the array are derived as follows, referring now to FIG. 7. If the side of the pixel 710 is said to be 1 unit, then the distances 712 and 714 are both 0.5 units. The distance 716 is determined by the geometry of the triangle 718 formed on pixel 710. The triangle is formed by the 1 unit side, a bisector of the lower angle of the hexagon (leaving a 60-degree angle), and the line running perpendicular to the side of the pixel 710. The triangle is a 30-60-90 triangle with hypotenuse of 1, and sides of 0.5 and $\sqrt{3}/2$. Therefore the distance 716 is the same as the 0.5 side. Therefore, the height of each pixel, drawn from middle of post 720 to middle of post 722, equals 1.5 units.

Multiplying the 1.5 unit height times the 1152 pixel height yields an array height of 1728 units. For proper aspect ratio, 1728 units is multiplied by 16:9, equalling 3072 units wide. Going back to triangle 718, it shows that one unit is 3(2×3/2) pixel widths, so the array is 3072 units/3 pixels widths per unit, equalling 1774 pixels wide. Therefore the final array has dimensions of 1774×1152. Using hex pixels does not significantly lower the active area of each pixel. The area of a square pixel is $17^2$, or 289 square microns. The area of a hex pixel is 282 square microns. As an additional benefit, hexagonal pixels, such as pixel 710, more closely approximate a circle than do square pixels and hence give have a more uniform response in the spatial frequency domain which can be an advantage in display systems (REF).

Figure 5B:
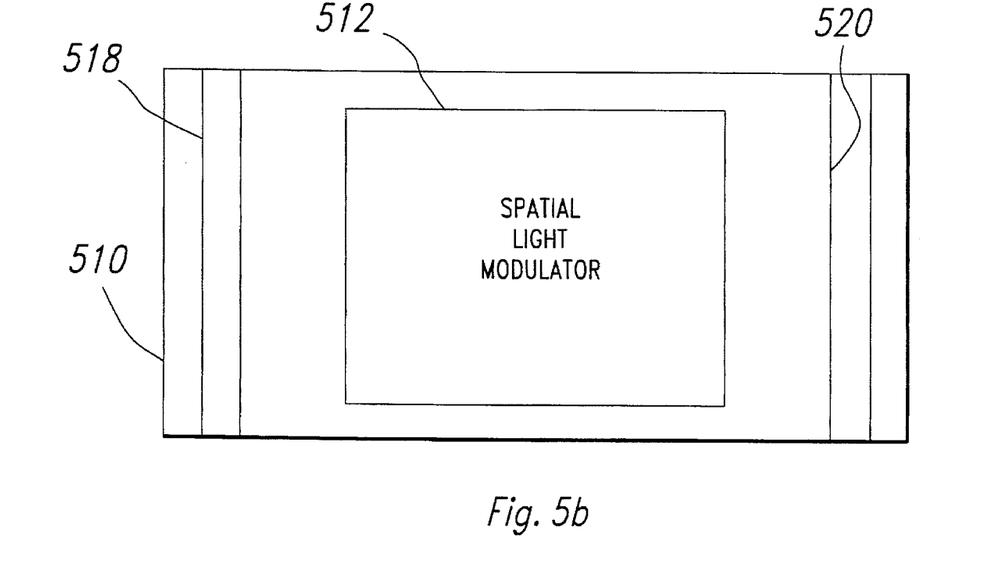

Referring back to FIG. 5b, it shows that all of the standards, including US-HD, can fit onto the face of the new array. US-HD does not have to be shrunk or stretched significantly. The other standards would have to be stretched, NTSC and HD-MAC by 13%, and MUSE by 8%. The advantage is that these are analog standards and can be sampled at whatever frequency desired to achieve the proper dimension, with only the addition of a variable frequency clock and the analog/digital converter.

Figure 8A:
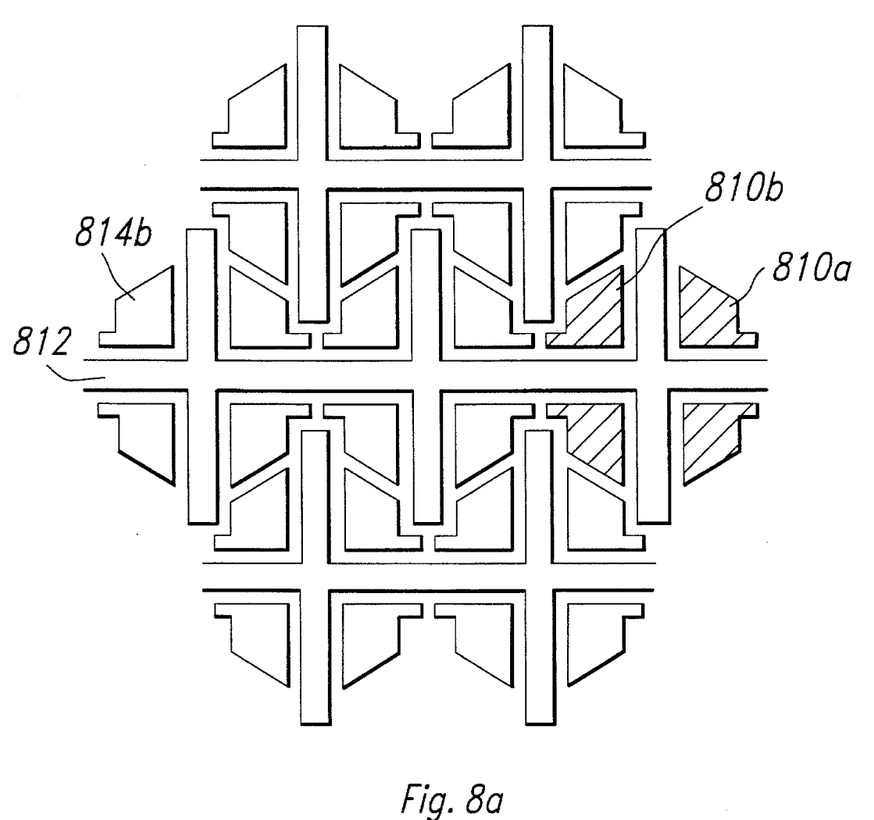
FIGS. 8a–8b show examples of electrode structure for hexagonal shaped DMDs.

One other advantage, previously alluded to is the electrode structure and the features it enables. The electrode structure, is shown in one configuration in FIG. 8a. In this example, the electrodes from one pixel are shaded. Electrodes 810a and 810b are tied together underneath the region 812. The tying can be done at first-level metal underneath the area 812, or by doping, or any other techniques well-known in the art to make connections. When they are activated, the pixel would tilt towards them, and the tip would land on that portion of region 72, which is at the same bias as the pixel. To reset the line of pixels, the line of electrodes running from 810a–814b from right to left across the figure would be set to zero, and the region 812 would have the reset signal applied, demonstrating how line-at-a-time reset would work.

Figure 8B:
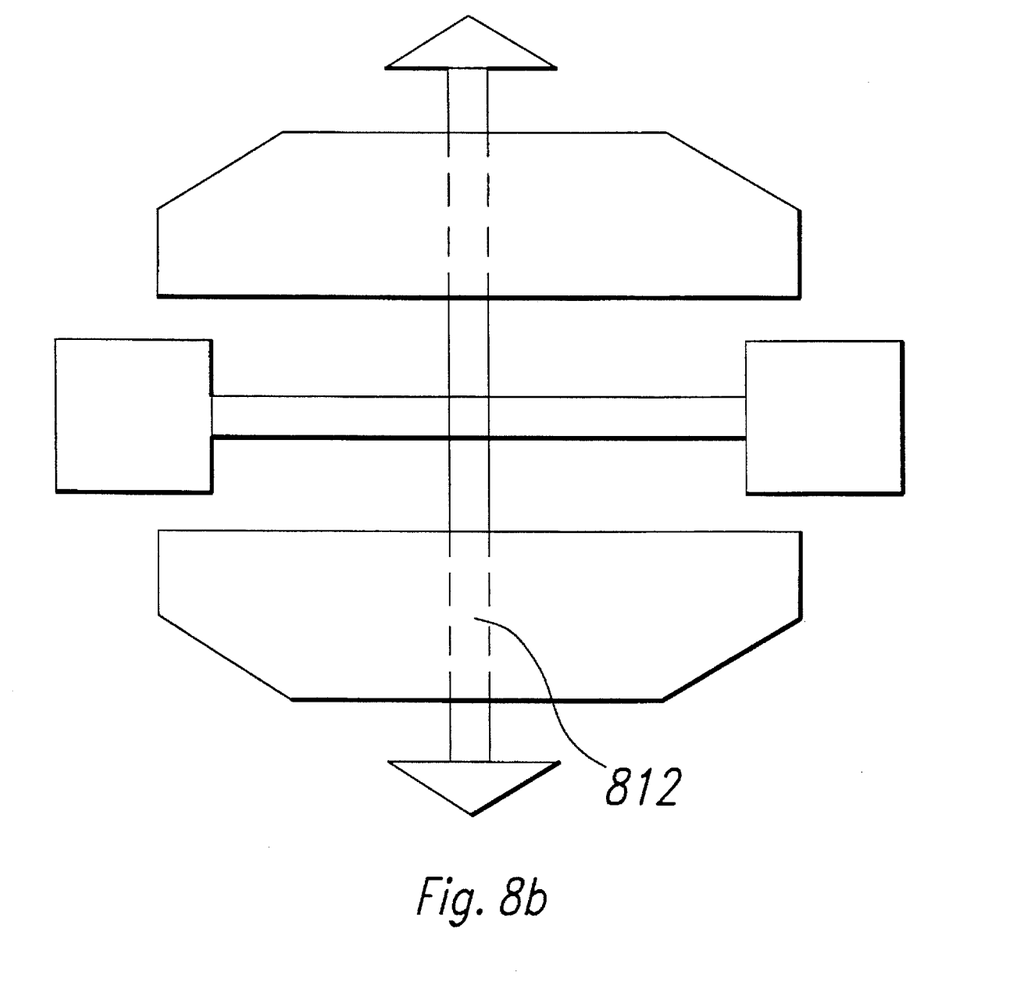

Another option for the electrode structure is shown in FIG. 8b. It is very similar to FIG. 8a, except that the electrodes are the top layer, and the landing region is underneath. In this case, the landing regions would need to be tied together underneath the electrodes. An advantage of this could be that the amount of voltage required to attract the mirror could be reduced, since the surface area generating the electrostatic attraction would be increased. However the electrodes are structured, the line-at-a-time reset remains an advantage that makes this particular structure particularly suitable for the multi-format television. As was seen in FIGS. 8a and 8b, there are black bands around the image that are not used for different formats as they are fit onto the spatial light modulator. The line accessibility of the hexagonal grid, regardless of actual pixel shape, makes the data handling simpler.

The following table compares several example systems based on each SLM of FIG. 5. The relative merits of each are shown. Each system will support various combinations of NTSC, HD-MAC, Baseband MUSE, and US-HD formats. Depending upon the processing approach, the total system costs and performance will vary. Proposed in the chart above is the cost implications of each system. The system comprises SLM 118, digital processing unit 116, and tuner/preprocessor 114. Conclusively, any system which requires US-HD will benefit by 26% cost savings.

| | 2048 × 1152 Square Pixel SLM | 1774 × 1152 Hex Pixel SLM |
|---|---|---|
| DMD Relative Cost | 0% | −13% |

|  | 1 | 2 | 3 | 4 | 5 | 6 | 7 | 8 |
|---|---|---|---|---|---|---|---|---|
| NTSC H × 480 A) B) | A/D 0% | A/D 0% | A/D 0% | | A/D | A/D | A/D | |
| US-HD 1440 × 960 (1707 decoded) A) B) | D 0% | D 0% | D 0% | D 0% | NONE -13% | NONE -13% | NONE -13% | NONE -13% |
| Baseband MUSE 1920 × 1080 analog A) B) | A/D 0% | | A/D 0% | | A/D 0% | | A/D 0% | |
| HD-MAC 2048 × 1152 analog A) B) | A/D 0% | | | | A/D 0% | | | |
| Relative Cost | 0% | 0% | 0% | 0% | −26% | −26% | −26% | −26% |

Thus, although there has been described to this point particular embodiments of a multi-format television system, with accompanying algorithms and hardware, it is not intended that such specific references be considered as limitations upon the scope of this invention except in-so-far as set forth in the following claims.

What is claimed is:

1. A spatial light modulator comprising:
   a. substrate;
   b. an array of lines of elements on said substrate, wherein each element comprises:
      i. at least two electrodes on said substrate, arranged such that said electrodes are in electrical connection with electrodes of adjacent elements, allowing reset of an entire line of elements;
      ii. a hexagonal reflective surface;
      iii. at least two support posts holding said reflective surface above said electrodes, over an air gap, said support posts being on opposite sides of said hexagonal reflective surface, thereby causing said elements to form said line of elements; and
      iv. flexible hinges connecting said reflective surface to said support posts, such that when one of said electrodes becomes active, said reflective surface can twist about said hinges and allow said reflective surfaces to deflect in response to said active electrode.

* * * * *